United States Patent [19]

Potter et al.

[11] 4,038,186
[45] July 26, 1977

[54] CARBON DECANTER

[75] Inventors: Clyde E. Potter, Bellflower; George N. Richter, San Marino, both of Calif.

[73] Assignee: Texaco Inc., New York, N.Y.

[21] Appl. No.: 650,385

[22] Filed: Jan. 19, 1976

Related U.S. Application Data

[62] Division of Ser. No. 621,704, Oct. 14, 1975.

[51] Int. Cl.$^2$ .................... B01D 11/02; B01D 21/24
[52] U.S. Cl. ..................... 210/92; 210/95; 210/207; 210/519; 210/540; 239/423; 259/95
[58] Field of Search ............ 210/83, 84, 86, 92, 210/95, 207, 209, 519, 534, 540; 239/423; 259/95

[56] References Cited

U.S. PATENT DOCUMENTS

| 473,326 | 4/1892 | Metz | 210/95 |
|---|---|---|---|
| 1,159,044 | 11/1915 | Kelly, Jr. | 210/537 |
| 2,047,989 | 7/1936 | Woelflin | 210/519 X |
| 2,457,828 | 1/1949 | Lloyd | 210/534 |
| 2,570,977 | 10/1951 | Pettefer et al. | 210/103 |
| 2,744,630 | 5/1956 | Hughes | 210/540 |
| 3,393,804 | 7/1968 | Miller et al. | 210/207 X |
| 3,737,105 | 6/1973 | Arnold et al. | 239/423 |
| 3,917,569 | 11/1975 | Richter et al. | 210/21 |
| B 401,221 | 4/1976 | Tuttle | 210/519 X |

FOREIGN PATENT DOCUMENTS

| 297,587 | 5/1971 | U.S.S.R. | 210/519 |
|---|---|---|---|

Primary Examiner—Thomas G. Wyse
Assistant Examiner—R. G. Mukai
Attorney, Agent, or Firm—Thomas H. Whaley; Carl G. Ries; Albert Brent

[57] ABSTRACT

This is an apparatus for continuously separating a liquid mixture comprising particulate carbon produced by the partial oxidation of a hydrocarbonaceous fuel, water, and liquid organic extractant into two separate immiscible streams i.e. a stream of particulate carbon-liquid organic extractant dispersion and a separate stream of clarified water. The subject apparatus may be referred to as a carbon decanter and comprises a closed pressure vessel whose horizontal cross-section is circular. Thus, the decanter may be shaped like a vertical cylinder or may be spherical shaped with discharge ports in the top and bottom. The liquid mixture of particulate carbon, water, and liquid organic extractant is charged into said vessel by way of a conduit which terminates at a position within the vessel along the vertical axis about ¼ to ¾ of the vessel height and below the interface level which is formed in said vessel when the two immiscible liquids separate by gravity with the water forming a pool at the bottom of the vessel. Alternately, the decanter may be charged through two concentric pipes. A horizontal radial nozzle terminates each pipe. By this means the aforesaid mixture of immiscible liquids may be introduced into the decanter by way of an annular passage located between said pipes. Further, simultaneously a separate stream of liquid organic extractant may be passed through the center pipe and discharged adjacent to the interface level. The dispersion of particulate carbon-liquid organic extractant separates from the water and may be removed by way of the top port as a continuous stream. Simultaneously a continuous stream of clarified water may be removed from the bottom port.

9 Claims, 6 Drawing Figures

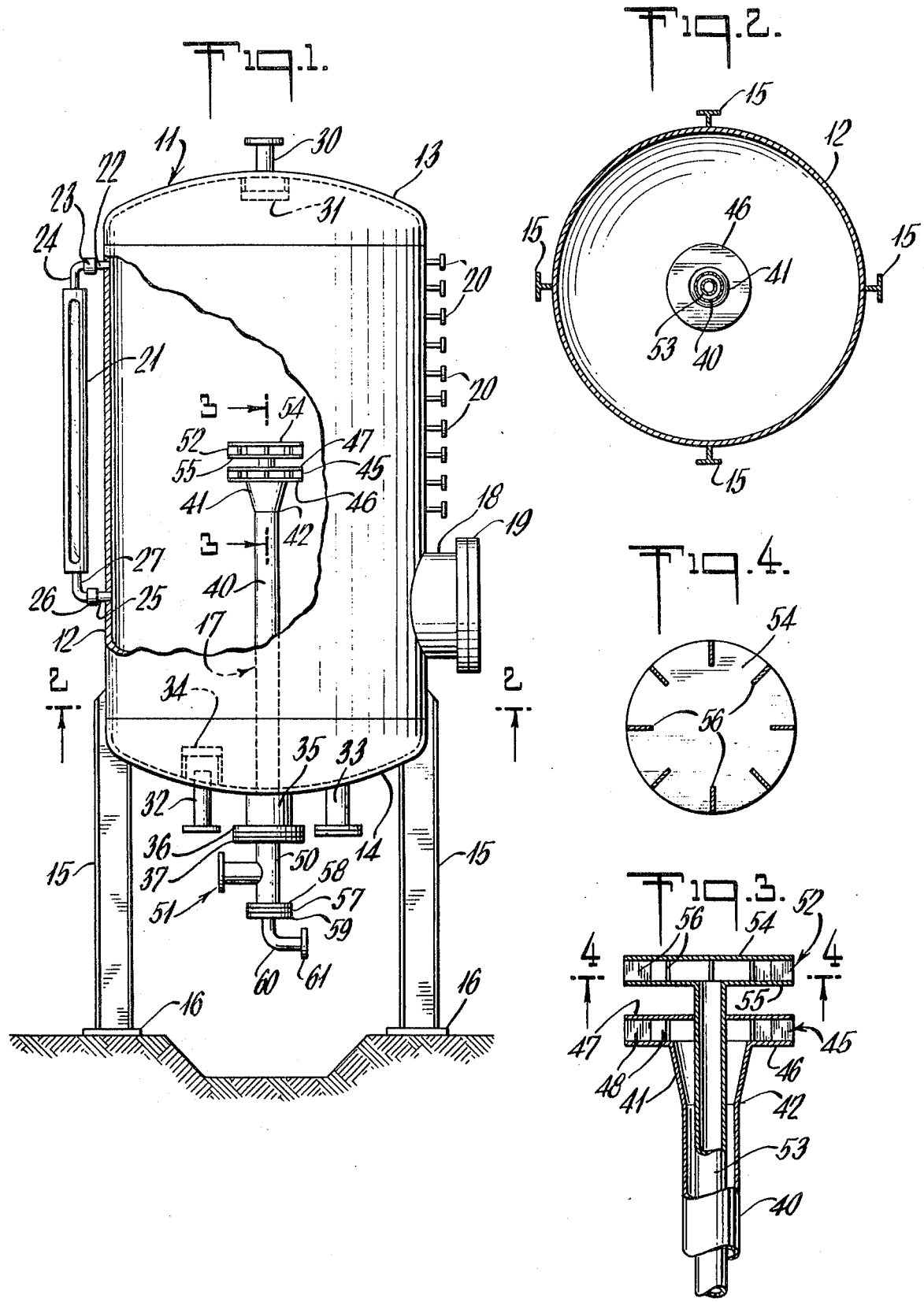

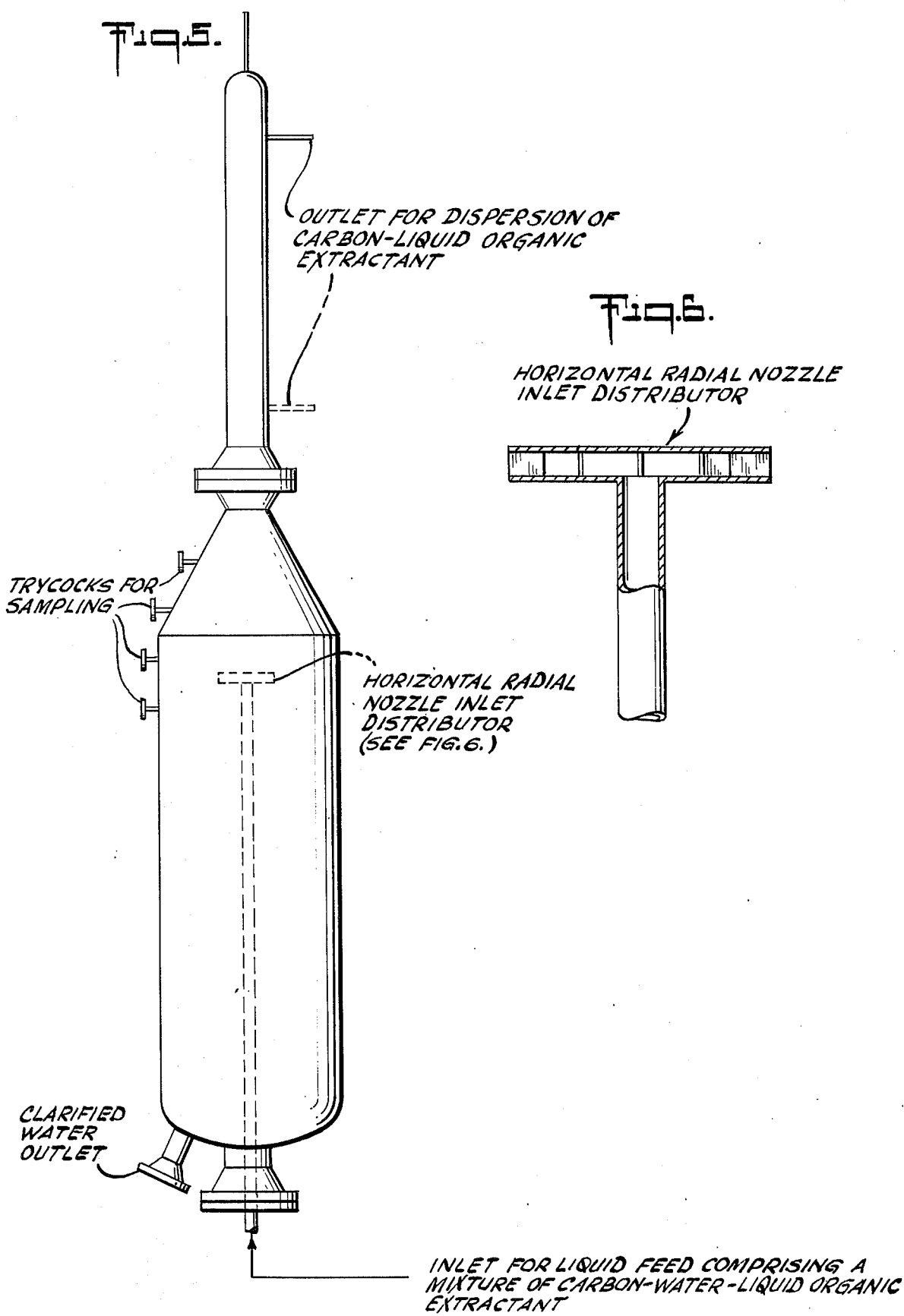

CARBON DECANTER

This is a division, of application Ser. No. 621,704 filed Oct. 14. 1975.

BACKGROUND OF THE INVENTION

1. Field of the Invention

This invention pertains to an apparatus for separating a mixture of immiscible liquids containing particulate carbon. More specifically, it relates to a decanter for separating a liquid-mixture comprising particulate carbon as produced by the partial oxidation of a hydrocarbonaceous fuel, water, and liquid organic extractant into a stream of particulate carbon dispersed in said liquid organic extractant and a stream of clarified water.

2. Description of the Prior Art

The partial oxidation of liquid hydrocarbons, especially heavy fuel oils, represents a highly economical method for the production of synthesis gas in large quantities. The effluent gas stream from the gas generator comprises $H_2$, CO, $H_2O$. $CO_2$ and at least one gas from the group $H_2S$, COS, $N_2$, Ar, and $CH_4$. Further, about 0.2 to 20 weight percent (basis C in the feedstock) of particulate carbon i.e., soot may be entrained in the stream of gases leaving the gas generator. It may be necessary in certain applications to remove the particulate carbon from the process gas stream. For example, to extend the life of catalysts that may be used in downstream process steps e.g. water-gas catalytic shift reaction, it is advisable to employ a feed gas which is free from entrained solids.

The solid particulate carbon produced in the partial oxidation process is liberated as very fine particles which are easily wet by water or oil. In coassigned U.S. Pat. No. 2,992,906-F.E. Guptill, Jr. the particulate carbon entrained in the process gases issuing from the gas generator is removed by scrubbing with water in a conventional gas-liquid contact apparatus, for example spray towers, and bubble or packed towers. A large volume of carbon-water dispersion is produced in the scrubbing zone containing less than about 2 percent solids, and preferably about 1 percent solids for satisfactory pumpability.

Economics and the avoidance of water pollution require that the carbon be separated from the water and recycled to the gas generator as a portion of the feed. The clarified water may be then recycled to the scrubbing zone. This separation may be accomplished by intimately contacting the carbon-water dispersion with a liquid hydrocarbon. The mixed stream is then passed into a separating zone where clarified water may be separated from a slurry of particulate carbon and liquid hydrocarbon.

In previous separators the feed was introduced at one end and the effluent stream was removed from the opposite end. Standing waves were produced in the vessel along with emulsions that interfered with the separation between the water and the dispersion of carbon and liquid hydrocarbon. Further, only about half of the volume of the vessel was used. These difficulties have been avoided by the subject invention.

SUMMARY

The subject invention pertains to a carbon decanter for simultaneously separating a liquid charge comprising a mixture of particulate carbon, water, and liquid organic extractant into a stream of particulate carbon-liquid organic extractant dispersion and a separate stream of clarified water. The subject decanter reduces the possibility of emulsions from forming and upsetting the flow in the decanter. The apparatus comprises a closed pressure vessel whose horizontal cross-section is circular. For example, the body of the decanter may be a hollow vertical cylinder or a hollow sphere. There is an upper exit port at the top of said vessel through which liquid dispersions of particulate carbon and extractant may be discharged, and a lower exit port at the bottom of said vessel through which clarified water may be simultaneously discharged. Conduit means is provided for simultaneously introducing the liquid charge into said vessel. The discharge end of said conduit means is located along the vertical axis of said vessel about $\frac{1}{4}$ to $\frac{3}{4}$ of the distance between the top and bottom of said vessel and below the interface level formed by said dispersion of particulate carbon and liquid organic extractant floating on a layer of said clarified water.

Alternately, said conduit means may comprise an outer pipe which passes through a wall of said vessel and along its vertical axis, an inner pipe concentric with said outer pipe and spaced therefrom to provide an annular passage for the flow of said liquid charge, a horizontally disposed first radial nozzle terminating said outer pipe for discharging below said interface level said liquid charge, and a horizontally disposed second radial nozzle terminating said inner pipe at a position beyond that of said first radial nozzle for discharging liquid organic extractant adjacent to said interface.

BRIEF DESCRIPTION OF THE DRAWING

The invention will be further understood by reference to the accompanying drawing in which:

FIG. 1 is a diagrammatic representation of the carbon decanter in elevation with parts broken away.

FIG. 2 is a horizontal cross sectional view of the apparatus of FIG. 1, taken along the line 2—2, of FIG. 1.

FIG. 3 is an enlarged fragmental vertical cross sectional view of the radial nozzles taken along line 3—3 of FIG. 1.

FIG. 4 is a horizontal view of the top plate of the upper horizontal radial nozzle showing spacers and baffles and taken along line 4—4 of FIG. 3.

DESCRIPTION OF THE DRAWING

A more complete understanding of the invention may be had by reference to the accompanying drawing which illustrates in FIGS. 1 through 4 one embodiment of the invention. Another embodiment is shown in FIGS. 5 and 6.

As shown in FIGS. 1 and 2, carbon decanter 11 is a closed hollow steel pressure vessel having a circular horizontal cross-section where the liquid feed is introduced. The vessel is represented in this embodiment as an upright vertical cylindrical water tight metal column essentially comprising: cylindrical shell body 12, upper head 13, lower head 14, support legs 15, ground pads 16, and conduit sub-assembly 17.

Cylindrical shell body 12 is provided with a large diameter flanged manway port 18 for entry into the decanter for adjustment of repair. Cover 19 is gasketed thereby providing a pressure tight seal. Ten trycocks 20 in spaced vertical alignment pass through the wall of body 12. By this means liquid samples may be taken at various levels. Sight glass 21 for interface level determination is connected through the vessels side wall by way of pipe 22, valve 23, pipe 24 and pipe 25, valve 26, and pipe 27.

Upper head 13 and lower head 14 are attached to body 12 by any suitable conventional method e.g. welding. Alternately, the heads and body may be equipped with flanges (not shown), gaskets, and bolted together. Flanged exit port 30 through which the dispersion of carbon-liquid organic extractant is removed is located in the center of upper head 13 at the highest point. Vortex breaker 31 is located at the inlet port 30.

Flanged exit port 32 through which the clarified water is removed, and flanged clean-out port 33 are located off-center in lower head 14. Vortex breaker 34 is located at the inlet to port 32. Sub-assembly 17 extends along the vertical axis of body 12. It enters through flanged inlet port 35 at the center of head 14 and is held in an up-right position by bolting together flanges 36 and 37.

Conduit sub-assembly 17 as shown in FIGS. 1 to 4 comprises outer pipe 40 with flange 37 on the lower end and a frusto-conically shaped tapered fitting 41 attached to the upper end at 42. Lower horizontal radial nozzle 45 is attached to the upper end of fitting 41 and comprises lower disc 46, upper disc 47, and a plurality of spacers 48 for separating discs 46 and 47 and directing the flow of the liquid being discharged from radial nozzle 45. "T"-fitting 50 with side inlet 51 is attached to flange 37. The mixture of carbon, water, and liquid organic extractant is introduced into conduit assembly 17 by way of side inlet 51.

A second horizontal radial nozzle 52 for simultaneously introducing additional liquid organic extractant adjacent to the interface level is located above radial nozzle 45 and is fixed to the upper end of concentric inner pipe 53. Radial nozzle 52 comprises upper disc 54, lower disc 55, and spacers 56 for separating discs 54 and 55 and controlling the directional flow of the liquid extractant through radial nozzle 52. Inner pipe 53 has flange 57 on the bottom end which is bolted to flange 58 of T-fitting 50 and to flange 59 of elbow 60. The aforesaid liquid organic extractant is introduced through flanged inlet 61 of elbow 60. Inner pipe 53 may be centered within outer pipe 40 by spacers (not shown) and passes through the center of upper disc 47 of lower radial nozzle 45. Optionally, outer pipe 40 and inner pipe 53 may be installed so that they may be separately or jointly moved up or down to adjust for the effect that any operational change may have on the interface level. For example, this may be done by threading external portions of pipes 40 and 53 for mating with internally threaded flanges 36 and 58 respectively.

In another embodiment of the invention, inner pipe 53, upper radial nozzle 52, and flanged elbow 60 are not used or deleted from conduit subassembly 17 and the entire amount of feed mixture and liquid organic extractant are charged together into decanter 11 by way of flanged inlet 51, pipe 40, fitting 41, and radial nozzle 45. In the event inner pipe 53 and radial nozzle 52 are deleted then the axial hole in upper disc 47 of radial nozzle 45 is also deleted.

Optionally, conduit subassembly 17 may first enter vessel 11 through a side wall and then proceed along the vertical axis to the desired point of discharge.

DESCRIPTION OF THE INVENTION

The present invention pertains to an apparatus for continuously and simultaneously separating a mixture comprising particulate carbon and two immiscible liquids into a liquid dispersion comprising particulate carbon and liquid organic extractant, and into a liquid comprising clarified water.

The subject apparatus is particularly applicable for use in cleaning processes that employ water for scrubbing particulate carbon from the stream of raw synthesis gas, fuel gas, or reducing gas produced by the partial oxidation of a hydrocarbonaceous fuel.

A short description of the partial oxidation process follows to enable one to better understand the nature of the apparatus.

The partial oxidation reaction takes place in a refractory lined free-flow unpacked steel pressure vessel such as that described in coassigned U.S. Pat. No. 3,097,081 issued to DuBois Eastman et al. The feed to the gas generator includes a hydrocarbonaceous fuel, a free-oxygen containing gas, and a temperature moderator.

The feedstreams are introduced into the reaction zone of the gas generator by means of a suitable burner. For example, a single annulus-type burner such as described in coassigned U.S. Pat. No. 2,928,460 issued to DuBois Eastman et al., or a multiple annulus-type burner as shown in coassigned U.S. Pat. No. 3,705,108 issued to C. P. Marion et al. may be used.

The feedstreams are reacted in the gas generator at an autogenous temperature in the range of about 1500° to 3000° F and at a pressure in the range of about 1 to 250 atmospheres. The reaction time in the gas generator is about 1 to 20 seconds. The effluent gas mixture leaving the gas generator comprises $H_2$, $CO$, $CO_2$, $H_2O$; at least one gas from the group $H_2S$, $COS$, $CH_4$, $N_2$, and $Ar$; and unreacted particulate carbon in the amount of about 0.2 to 20 weight percent (basis weight of carbon in the hydrocarbonaceous feed).

The particulate carbon produced in synthesis gas manufacture is unique and problems associated with the separation of synthesis gas carbon are not the same as those encountered in the removal of carbon or solids made by other processes. For example, the fine carbon particles from partial oxidation are unusual in that they will settle in water to only about 1.0 to 3.0 weight percent, whereas conventional carbon blacks may settle to concentrations of as much as 10 weight percent. The free carbon soot leaving the reaction zone entrained in the stream of product synthesis gas has some unique properties. It is both hydrophilic and oleophilic. It is easily dispersed in water and has a high surface area. For example, the specific surface area of the free carbon soot, as determined by nitrogen absorption, ranges 100 to 1,200 square meters per gram. The Oil Absorption Number, which is a measurement of the amount of linseed oil required to wet a given weight of carbon soot, ranges from 1.5 to 5 cc's of oil per gram of carbon soot. For further information regarding the test method of determining the Oil Absorption Number see ASTM Method D-281. Free carbon soot, also referred to herein as particulate carbon, as produced within our process has a particle size in the range of about 0.01 to 0.5 microns and commonly has a particle diameter of about 77 millimicrons. Free carbon soot comprises about 92 to 94 weight percent of carbon, 0.1 to 4 weight percent of sulfur, and 3 to 5 weight percent of ash. Being formed at high temperatures, it is substantially free from volatile matter.

The amount of soot in the product synthesis gas may be controlled primarily by regulating the oxygen to carbon ratio (O/C atom/atom) in the range of 0.7 to 1.5 atoms of oxygen per atom of carbon in the fuel, and to some extent by regulating the weight ratio of $H_2O$ to hydrocarbon fuel in the range of 0.15 to 3.0 pounds of $H_2O$ per pound of fuel. In the above relationship, the O/C ratio is to be based upon (1) the total of free-oxygen atoms in the oxidant stream plus combined oxygen atoms in the hydrocarbonaceous fuel feed molecules and (2) the total of carbon atoms in the hydrocarbonaceous fuel feed plus carbon atoms in recycled particulate carbon (soot).

To produce synthesis gas economically, it is important to separate clear water from the carbon-water mixture for reuse. However, the fine particle size of the carbon soot makes ordinary filtration methods difficult and makes gravity separation uneconomical because of excess settling times i.e., about 1–2 days. Separation times have been speeded up substantially by the subject carbon decanter at a decided economic advantage.

A wide range of carbon-containing organic materials or hydrocarbonaceous fuels, may be reacted in the gas generator to produce the raw effluent gas. The term "hydrocarbonaceous fuel", as used herein to describe various suitable feedstocks, is intended to include gaseous, liquid, and solid hydrocarbons, carbonaceous materials, and mixtures thereof, which singly or in admixture with one another are capable of sustaining an autogenous, uncatalyzed reaction with oxygen to produce an effluent gas stream comprising $H_2$, CO, $CO_2$, $H_2O$ and containing entrained particulate carbon. For example, there are (1) pumpable slurries of solid carbonaceous fuels, such as coal, particulate carbon, petroleum coke, concentrated sewage sludge, and mixtures thereof in water, oil, or water and oil emulsions; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel and particulate carbon dispersed in a temperature-moderating gas.

The term liquid hydrocarbon, as used herein to describe suitable liquid feedstocks, is intended to include various materials, such as liquefied petroleum gas, crude oil, crude residue, heavy distillates from crude oil, asphalt, gas oil, tar-sand and shale oil, coal oil, aromatic hydrocarbons (such as benzene, toluene, xylene fractions), coal tar, cycle gas oil from fluid-catalytic-cracking operation; furfural extract of coker gas oil; and mixtures thereof. Gaseous hydrocarbon fuels, as used herein to describe suitable gaseous feedstocks, include methane, ethane, propane, butane, pentane, natural gas, water, gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic and aromatic compounds in any proportion.

Also, included within the definition of the term hydrocarbonaceous fuels are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature or it may be preheated to a temperature up to as high as about 600° F to 1200° F, but preferably below its cracking temperature. The hydrocarbonaceous feed may be introduced into the burner in liquid phase or in a vaporized mixture with a temperature moderator.

The use of a temperature moderator to moderate the temperature in the reaction zone depends in general on the carbon to hydrogen ratio of feedstock and the oxygen content of the oxidant stream. A temperature moderator may not be required with some gaseous hydrocarbon fuels; however, generally one is used with liquid hydrocarbon fuels and with substantially pure oxygen. A previously mentioned, the temperature moderator may be introduced into the synthesis gas generator in admixture with either or both reactant streams. Alternatively, the temperature moderator may be introduced into the reaction zone of the gas generator by way of a separate conduit in the fuel burner. Suitable temperature moderators include $H_2O$, $CO_2$-rich gas, cooled clean gas from the gas generator or from a gas turbine which may be employed downstream in the process with or without admixture with air, by-product nitrogen from the air separation unit to be further described, and mixtures of the aforesaid temperature moderators.

The term free-oxygen containing gas, as used herein, is intended to include air, oxygen-enriched air, i.e., greater than 21 mole % oxygen, and substantially pure oxygen i.e., greater than 95 mole % oxygen (the remainder comprising $N_2$ and rare gases). Free-oxygen containing gas may be introduced into the burner at a temperature in the range of about ambient to 1200° F. The ratio of free-oxygen in the oxidant to carbon in the feedstock (O/C atom/atom) is in the range of about 0.70 to 1.5, and preferably about 0.84 to 0.97. Substantially pure oxygen is preferred to reduce the amount of nitrogen and other gaseous impurities in the product gas.

This hot effluent gas stream from the reaction zone may be quenched in water in the quench zone. A suitable quench tank is shown in coassigned U.S. Pat. No. 2,896,927. Alternatively, the hot effluent gas stream may be passed through a waste heat boiler in indirect heat exchange with water. The cooling water is converted to steam and the process gas stream is cooled to a temperature in the range of about 500° to 900° F. The process gas stream is then scrubbed with water in a conventional gas scrubbing zone to remove suspended particulate carbon and other solid particles.

The pumpable carbon-water dispersion obtained from the quench and scrubbing zones contains about 0.5 to 3 weight percent of particulate carbon. Further, it is economic to recover and recycle the water in the carbon-water dispersion to the quench tank or scrubbing zone and to recycle the particulate carbon to the gas generator as a portion of that hydrocarbonaceous feed. This may be accomplished by mixing the carbon-water dispersion with a liquid organic extractant by means of a suitable conventional mixer, e.g. a mixing valve, and introducing the mixture into the subject carbon decanter. There the carbon is separated from the water and forms a carbon-liquid organic extractant dispersion which floats on the water. The pumpable carbon-liquid organic extractant layer containing about 0.5 to 9 weight percent of particulate carbon may be drawn off and mixed with a heavy hydrocarbonaceous fuel oil such as crude oil. This mixture is separated by distillation into a liquid organic extractant fraction which is recycled to the separation zone (decanter) and a slurry of carbon and heavy hydrocarbonaceous fuel which is supplied to the gas generator as a portion of the feed.

The liquid organic extractant may be any pumpable organic liquid which is immiscible with water and for which the particulate carbon has a greater affinity for then it has for water. Preferably, the resulting carbon-liquid organic dispersion is lighter than water so that it will separate from and float on the separated clarified water. The carbon-extractant dispersion may be then removed at the top of the decanter while the clarified water may be removed through an outlet in the bottom.

Suitable liquid organic extractants that form dispersions with particulate carbon which are lighter than water include: (1) light liquid hydrocarbon fuels having an atmospheric boiling point in the range of about 100° to 750° F, degrees API in the range of over 20 to about 100, and a carbon number in the range of about 5 to 16; (2) a mixture of liquid organic by-products from an oxo or oxyl process; and (3) mixtures of types (1) and (2). Examples of type (1) liquid extracts include butanes, pentanes, hexanes, toluol, natural gasoline, gasoline, naphtha, gas oil, their mixtures and the like. Ingredients of type (2) extractants are shown in Table I.

TABLE I

INGREDIENTS IN LIQUID ORGANIC BY-PRODUCTS OF OXO OR OXYL PROCESS

| Group | Carbon Range | Wt. % |
|---|---|---|
| Alcohols | $C_3$ to $C_{16}$ | 2 to 75 |
| Esters | $C_6$ to $C_{28}$ | 5 to 70 |
| Aldehydes | $C_3$ to $C_{16}$ | Nil to 25 |
| Ketones | $C_3$ to $C_{16}$ | Nil to 25 |
| Ethers | $C_6$ to $C_{28}$ | Nil to 50 |
| Acids | $C_3$ to $C_{16}$ | Nil to 10 |
| Olefins | $C_5$ to $C_{15}$ | Nil to 30 |
| Saturated Hydrocarbons | $C_5$ to $C_{28}$ | Nil to 50 |
| Water | | Nil to 15 |

The oxo process is the commercial application of a chemical reaction called oxonation or, more properly, hydroformylation. In this catalytic reaction, hydrogen and carbon monoxide are added across an olefinic bond to produce aldehydes containing one more carbon atom than the olefinic, and the coproducts shown in Table I.

The oxyl process is a method for directly producing alcohols by catalytically reducing carbon monoxide with hydrogen so as to link several partially reduced carbon atoms together. Essentially it is a modified Fischer-Tropsch Process which preferentially produces oxygenated compounds consisting mainly of alcohols, and the coproducts shown in Table I.

The subject unique and improved carbon decanter carries out the previously mentioned step in the carbon removal process wherein the feed mixture comprising an intimate mixture of particulate carbon, water, and liquid organic extractant is separated by gravity into two phases. These two phases which consist of (1) a dispersion of particulate carbon in liquid organic extractant having a solids contact in the range of about 0.5 to 9 weight percent, and (2) clarified water are then continuously and separately removed from the decanter.

Emulsion formation is reduced or eliminated by use of the subject carbon decanter. This is beneficial because emulsions lead to poor phase separation, and subsequently in the process to poor operation of the particulate carbon-liquid organic extractant stripper. Such trouble may result in deteriorated performance of the carbon removal system and can lead to limitations in output or shutdown of the complete synthesis gas production facility.

Other advantages of the subject invention follow. During operation, the decanter is substantially filled with liquid so that there are no dead spots or empty areas. Because of this the size and cost of the decanter for a given through-put may be reduced. Further, there are substantially no carbon particles settling from the dispersion, no abnormally heavy interface layer, and no turbulence or undesirable motion set up in the decanter.

While FIG. 1 of the drawings shows the body of the decanter to be an elongated vertical cylinder, other geometric forms whose horizontal cross sections are circular may be used. Other shapes for example include: a vertical cylinder with a conical top section, and as shown in FIG. 5, a vertical cylinder with an axial cylindrical dome of smaller diameter in tandem. Further for very high pressure work i.e., 80 to 250 atmospheres the body of the decanter may be spherically shaped.

Two alternate ways may be used to introduce the feed materials into the subject decanter. In the first case as shown in FIG. 6 all of the liquid organic extractant in admixture with all of the carbon-water dispersion is passed through a single horizontal radial distributor or nozzle located along the vertical axis of the vessel about ¼ to ¾ of the height of the vessel, and preferably at the vertical center line of the vessel. It is desired to distribute the feed below the interface level.

The interface level is produced in the decanter by the carbon-water dispersion being resolved by the liquid organic extractant to produce a dispersion of carbon and liquid organic extractant which separates from and floats on the water that has fallen by gravity to the bottom of the vessel. Water is continuously removed through a nozzle at the bottom of the decanter, while simultaneously the carbon-liquid organic extractant dispersion is continuously removed through a nozzle in the top of the decanter.

The total amount of liquid organic extractant used to resolve the carbon-water dispersion is in the range of about 2 to 200 times, such as 20 to 70 times the weight of the particulate carbon in the carbon-water dispersion.

The decanter operates at a temperature in the range of about 212° to 650° F, and preferably above 250° F. The pressure in the decanter is basically set by the temperature. The pressure must be high enough to keep the liquid organic extractant from vaporizing in the decanter. Thus, when the decanter bottoms outlet temperature is 300° F, and the liquid organic extractant is naphtha, the pressure in the decanter may be at least 300 psia.

The volume of the decanter is such as to provide a sufficient residence time for phase se separation to occur at a specified flow rate. Thus, the residence time for the water phase and the liquid organic extractant phase in the decanter may be in the range of about 2 to 20 minutes and preferably about 6 to 15 minutes.

The horizontal radial nozzle may comprise two parallel discs of equal diameter which are separated by a plurality of radial fins. The bottom disc has a center hole for use as a feed inlet. These radial fins also distribute the liquid charge to the decanter in a uniform 360° pattern. Each radial fin extends about ¼ to ¾ of the distance between the circumference and the center of the disc. A vertical feed pipe is attached to the center of the bottom disc and is in communication therewith by way of said center hole. The vertical feed pipe is preferably passed through the bottom of the decanter and up along its vertical axis. Alternately, the feed pipe may be brought in through a side wall and then passed along the vertical axis. The velocity of the liquid feed passing through the horizontal radial nozzle is in the range of about 0.10 to about 0.50 feet per second while the velocity of the feed passing through the vertical feed pipe is in the range of about 0.5 to 10 feet per second. The superficial vertical velocities of the liquid organic extractant and the water should be on the order of about 0.2 to 2 feet per minute so as to allow phase separation with only gentle mixing within the upper or dispersion of carbon-liquid organic extractant layer.

The second way for introducing the feed materials into the subject decanter is shown in FIG. 3 of the drawing. Two parallel horizontal radial nozzles of the type previously described, whose centers pass through the vertical axis of the vessel are employed. The center hole in the lower disc of the lower horizontal radial nozzle is in communication with an outer vertical feed pipe. An inner vertical feed pipe concentric with and inside said outer vertical feed pipe passes up through the lower and upper discs of said lower horizontal radial nozzle and is joined to the underside of the lower disc of said upper horizontal radial nozzle. The inner vertical feed pipe is in communication with said upper horizontal radial nozzle by way of a central hole in the lower disc of said upper radial nozzle.

The upper horizontal radial nozzle is located adjacent to or below the normal interface between the dispersion of carbon-liquid organic extractant and the water layer. The lower horizontal radial nozzle is located below said interface level and for example at least about 60 mm below said upper horizontal radial nozzle.

Carbon-water dispersion in admixture with a portion of the liquid organic extractant is passed through the annular passage between said outer and inner vertical pipes and then discharged through the lower horizontal radial nozzle. Simultaneously the remainder of the liquid organic extractant i.e., about 85 to 95 weight percent of the amount of liquid organic extractant is introduced into the decanter by way of the inner vertical pipe which is in communication with the upper horizontal radial nozzle. This stream of liquid organic extractant floats off the particulate carbon from the surface of the clarified water layer with a minimum of mixing so that emulsion formation is avoided by introducing a radial horizontal stream of liquid organic extractant. The sweeping action across the interface will also disperse the carbon in the liquid extractant. The amount of liquid organic extractant that is uniformly distributed 360° by way of the upper horizontal radial nozzle is sufficient to form a carbon-extractant dispersion containing about 0.5-9 wt. % carbon.

Suitable, the ratio of the diameter of the interface to the outside diameter of the horizontal, radial nozzle or nozzles may be in the range of about 3 to 8.

The actual amount of liquid organic extractant to be mixed with the carbon-water dispersion for distribution by way of the lower horizontal radial nozzle may be determined experimentally by shake tests. Thus, the liquid organic extractant is added to a sample of the carbon-water dispersion in increments with intermediate shaking until sufficient oil has been added to cause the carbon to separate rapidly and float on the surface of the clarified water. When the carbon appears "dry and fluffy", the amount of extractant is optimum. The amount of liquid organic extractant added will roughly fall within the range between 1 and 3 times the oil absorption number (ASTM D281-31) of the particulate carbon in the carbon-water dispersion. This may range between about 1.5-15 lbs of extractant per lb. of carbon or more likely in the range of about 1.5 to below 5.

Decanter operating conditions for the two horizontal radial nozzle embodiment are substantially the same as those given previously for the one horizontal radial nozzle. Mixtures of liquid organic extractant including petroleum residua (0° to 20° API) may be passed through the upper radial nozzle.

Additional advantages of the subject invention include: (1) greatly relaxed specifications on the liquid organic extractant, this would also simplify stripper design; (2) two types of liquid organic extractant may be simultaneously employed, one of which may be low cost fuel oil; (3) decanter and stripper size may be reduced due to higher soot loadings; (4) decanter residence time reduced due to lower possibility of emulsion formation; and (5) lower water carryover to stripper.

Optionally, conventional instrument may be used for such purposes as measurement or control of pressure, temperature, or interface level position.

Other modifications and variations of the invention as hereinbefore set forth may be made without departing from the spirit and scope thereof, and therefore only such limitations should be imposed on the invention as are indicated in the appended claims.

We claim:

1. An apparatus for continuously separating by gravity a liquid feed stream comprising a mixture of particulate carbon, water and liquid organic extractant into a dispersion of particulate carbon-liquid organic extractant and clarified water, which dispersion floats on said clarified water at the interface level comprising: a closed vessel having a substantially circular horizontal cross-section, an exit port in the upper portion of said vessel through which said liquid dispersion of particulate carbon and extractant is discharged, an exit port in the lower portion of said vessel through which said clarified water is simultaneously dicharged, outer conduit means entering said vessel and passing along the vertical axis, inner conduit means connected to a source of liquid organic extractant and concentric with said outer conduit and spaced therefrom to provide an annular passage which is connected to a source of said liquid feed stream and through which said liquid feed stream is introduced into said vessel, a horizontally disposed first radial nozzle in communication with said annular passage and terminating said outer conduit means within said vessel along the vertical axis about $\frac{1}{4}$ to $\frac{3}{4}$ of the height of said vessel for distributing said liquid feed stream below said interface level, and a horizontally disposed second radial nozzle in communication with and terminating said inner conduit at a position above that of said first radial nozzle for distributing said stream of liquid organic extractant.

2. The apparatus of claim 1 provided with locating means for determining the position of said interface level.

3. The apparatus of claim 1 provided with a plurality of vertically spaced trycocks passing through the sidewall of said vessel from about the midpoint to the top for sampling the liquids at various levels.

4. The apparatus of claim 1 wherein said outer conduit means comprises a straight pipe entering from the bottom of said vessel and passing up along its vertical axis to a position below said interface and said top exit port lies along the vertical axis of said vessel.

5. The apparatus of claim 1 wherein the body of said vessel has the shape of a vertical cylinder.

6. The apparatus of claim 5 wherein said vertical cylinder has a conical top section.

7. The apparatus of claim 5 wherein said vertical cylinder fairs into a tandem axial cylinder of smaller diameter containing said exit port for discharging said liquid dispersion of particulate carbon and extractant.

8. The apparatus of claim 1 wherein said vessel is spherically shaped and said top and bottom exit ports lie along the vertical axis of said vessel.

9. The apparatus of claim 1 wherein said first and second horizontal radial nozzles distribute said liquids 360°.

* * * * *